US009916767B2

(12) United States Patent
Sweet (10) Patent No.: US 9,916,767 B2
(45) Date of Patent: Mar. 13, 2018

(54) DEVICE AND METHOD FOR SIMULATING A TRANSPORTATION EMERGENCY

(71) Applicant: S&S Medical Products, LLC, Bellbrook, OH (US)

(72) Inventor: Russell A. Sweet, Springboro, OH (US)

(73) Assignee: S&S Medical Products, LLC, Bellbrook, OH (US)

( * ) Notice: Subject to any disclaimer, the term of this patent is extended or adjusted under 35 U.S.C. 154(b) by 193 days.

(21) Appl. No.: 13/838,041

(22) Filed: Mar. 15, 2013

(65) Prior Publication Data

US 2014/0272831 A1    Sep. 18, 2014

(51) Int. Cl.
*G09B 9/00* (2006.01)
*G09B 23/32* (2006.01)

(52) U.S. Cl.
CPC .............. *G09B 9/00* (2013.01); *G09B 23/32* (2013.01)

(58) Field of Classification Search
CPC ............. G09B 9/00; G09B 9/04; G09B 19/00
See application file for complete search history.

(56) References Cited

U.S. PATENT DOCUMENTS

| | | | |
|---|---|---|---|
| 2,232,382 A * | 2/1941 | Graze | B02C 19/0087 241/99 |
| 3,793,874 A * | 2/1974 | Shockey et al. | 73/12.11 |
| 5,918,762 A | 7/1999 | Gaba | |
| 6,263,818 B1 * | 7/2001 | Dietens | B63B 1/04 114/56.1 |
| 7,464,776 B2 * | 12/2008 | Heine | B62D 1/00 180/11 |
| 2003/0226884 A1 | 12/2003 | Swider | |

(Continued)

FOREIGN PATENT DOCUMENTS

DE    2011000695 U1 *    9/2011
DE    202011000695        10/2011

(Continued)

OTHER PUBLICATIONS

"Dimensions: Seating Capacity," Consumer Reports, http://www.consumerreports.org/cro/cars/types/seating-comparison.htm.*

(Continued)

*Primary Examiner* — Jacky Yip
*Assistant Examiner* — Jennifer L Korb
(74) *Attorney, Agent, or Firm* — FisherBroyles, LLP; Susan M. Oiler (57) ABSTRACT

Devices for simulating a transportation emergency and kits for the same are disclosed. The devices have a base with a framework of interconnected supports extending therefrom as a skeletal portion of a simulated transportation device and defining a chamber configured to receive a human or a medical-training manikin. Within the chamber a seat for receiving the human or the medical-training manikin is disposed. The framework defines one or more openings representative of access openings into the simulated transportation device such that a first responder in-training can receive instructions on how to assist a victim positioned in the simulated transportation device. The framework also defines one or more open frames representative of structural features of the simulated transportation device that block access to the victim such that realistic training occurs.

21 Claims, 9 Drawing Sheets

(56) References Cited

U.S. PATENT DOCUMENTS

| | | | |
|---|---|---|---|
| 2006/0293820 A1* | 12/2006 | Hicks | 701/45 |
| 2010/0019546 A1 | 1/2010 | Stephens | |
| 2012/0328816 A1* | 12/2012 | Salentine | A62B 3/00 428/40.1 |

FOREIGN PATENT DOCUMENTS

| | | | |
|---|---|---|---|
| FR | 2951304 | | 4/2011 |
| FR | 2951304 A | * | 4/2011 |
| GB | 2281269 | | 3/1995 |
| GB | 2281269 A | * | 3/1995 |

OTHER PUBLICATIONS

"Innovative Design of Futuristic Glass Body Car," R & R Associates, http://www.rnrassociates.com/wordpress/innovative-design-of-futuristic-glass-body-car/, Dec. 22, 2010.*

"A Clear Fascination," Benjella, The Thought Pantry, http://web.archive.org/web/20100908014558/http://thoughtpantry.wordpress.com/2010/08/01/a-clear-fascination/, Sep. 8, 2010.*

PCT, International Search Report and Written Opinion, International Application No. PCT/US2014/017554 (dated Jul. 14, 2014).

English Translation, FR2951304 (published Apr. 2011), provided by the International Searching Authority with the International Search Report and Written Opinion.

Office Action, U.S. Appl. No. 14/454,103 (dated Mar. 29, 2017).

AU, Examination Report No. 1, Australian Patent Application No. 2014238259, 4 pages (dated Mar. 6, 2017).

* cited by examiner

DEVICE AND METHOD FOR SIMULATING A TRANSPORTATION EMERGENCY

FIELD

The present patent application relates to transportation device teaching or training tools, and, more particularly, to devices, methods, and kits for teaching and practicing transportation device rescue techniques.

BACKGROUND

Emergency situations regularly result from high speed collisions between vehicles, especially motor vehicles, and other vehicles and stationary objects. In a significant number of severe motor vehicle accidents, occupants who need immediate medical attention become trapped within a damaged vehicle. Often, the occupants cannot be extricated by emergency personnel without the assistance of specialized vehicle extraction equipment.

In other situations, conventional entry methods may be blocked, obscured, or otherwise anomalously oriented as compared to the vehicle's normal operating orientation, for example, if vehicle is turned on its side, but emergency personnel may nonetheless access the occupants. First responders such as Emergency Medical Services (EMS) personnel, firefighters, and police officers are often the first people at the scene, so it is critical that these individuals are well-trained in the art of vehicle extrication in a wide range of potential transportation-related emergency scenarios. Occupant survival may hinge on the skill and preparedness of the first responder.

Conventional training techniques do not adequately prepare first responders for the tasks they may face at the scene of a vehicle emergency. One common technique is for the instructor to position a manikin (or another person) in a chair in a classroom, where the instructor will instruct a trainee and any onlookers to pretend that the manikin is a victim in need of medical attention that is trapped in a vehicle. The trainee will then use the rescue techniques learned in the class on the manikin with the imaginary emergency scenario in mind. This method is flawed in several respects. To start, it heavily relies on the imaginative powers of the trainees to visualize the context of the simulated environment, and may be ineffective if the trainees do not take the exercise seriously. Also, the exercise does not provide a realistic training scenario because there are no physical obstacles such as a vehicle frame, a steering column, a dashboard, and the like that the trainee would invariably encounter in a real-world rescue situation. Still further, the method provides limited ability to alter the positioning of the simulated victim beyond an upright, level orientation.

Another conventional training technique is to use an actual vehicle for the exercises, such as a car from a junk yard, that is modified for training purposes. This technique is more realistic because the trainee is working within the confines of a motor vehicle and must therefore overcome physical obstacles to perform the rescue exercise. But there are also many drawbacks. Like the chair method, the use of an actual vehicle limits the opportunity to alter the orientation of the victim because an actual vehicle is too heavy to turn on its side or top, and even if it were repositioned, it may lack sufficient stability in the repositioned state to safely conduct the training. The sheer size of the vehicle also necessitates an outdoor or garage environment, which is inconvenient if the class is normally held in a classroom. Further, while the trainee actually performing the simulated rescue may have a valuable learning experience, training with an actual vehicle is of little benefit to onlookers because the car frame will obscure their view. This aspect also impairs the instructor's ability to train in the actual vehicle, because the instructor's view may also be obscured, thus limiting the instructor's capacity to provide meaningful feedback to the trainee.

It is common for training courses to use a mix of these techniques, where the primary learning takes place in the classroom with a chair simulation, but the class has one or a few opportunities to practice the techniques introduced and practiced in the classroom with an actual vehicle. Still, even the combination of these methods does not sufficiently prepare trainees, because training time with the actual vehicle (the more realistic training tool) is limited, and depending on class size and access to the vehicle, there may not be sufficient time allotted for each trainee to have a training session in the vehicle, let alone multiple sessions.

Accordingly, those skilled in the art continue to seek improved devices and techniques to simulate transportation related emergency situations in the classroom environment to train and prepare EMS personnel and other first responders.

SUMMARY

Devices for simulating a transportation emergency and kits for the same are disclosed. The devices have a base with a framework of interconnected supports extending therefrom as a skeletal portion of a simulated transportation device and defining a chamber configured to receive a human or a medical-training manikin. Within the chamber a seat for receiving the human or the medical-training manikin is disposed. The framework defines one or more openings representative of access openings into the simulated transportation device such that a first responder in-training can receive instructions on how to assist a victim positioned in the simulated transportation device. The framework also defined one or more open frames representative of structural features of the simulated transportation device that block access to the victim such that realistic training occurs.

The kits have at least two framework sections and a seat for receiving a human or a medical-training manikin. The framework sections are removably attachable to each other to form a base and a framework of interconnected supports extending from the base to define a skeletal portion of a simulated transportation device and a chamber configured to receive the human or the medical-training manikin. Further, the seat is positionable within the chamber.

In another aspect, a breaking-glass simulator is disclosed. The breaking-glass simulator includes a container with an exterior surface and an internal volume, the container having a hole passing through the exterior surface to the internal volume of the container. The simulator also has a sheet holder positioned with the internal volume of the container, the sheet holder being configured to receive a sheet of breakable material. The sheet holder is configured to retain the sheet of breakable material proximate to the hole of the container.

Other aspects of the disclosed devices, methods, and kits will become apparent from the following description, the accompanying drawings, and the appended claims.

DETAILED DESCRIPTION

The following detailed description will illustrate the general principles of the invention, examples of which are additionally illustrated in the accompanying drawings. In the drawings, like reference numbers indicate identical or functionally similar elements.

Referring to FIGS. 1-4, a vehicle emergency training device, generally designated 10, is shown. The device 10 has a body 12 formed of a framework 14 of interconnected horizontal and vertical supports 16, 18 that define a base 20 and a skeleton or skeletal portion 22 of the body 12. Collectively, the framework 14 defines an interior chamber 24 of the body 12 that is shaped to simulate the interior cavity and/or cabin of a transportation device such as a car, a truck, a bus, a train, an aircraft, a watercraft, a ski lift, a trolley, and the like, or at least a portion thereof. The interior chamber 24 of the body 12 may include a seat 26 therein configured to receive a human or a medical-training manikin 28. The interior chamber 24 may also include other props 29 such as a steering column 30 and a steering wheel 32 to further mimic the interior cavity of the transportation device being simulated.

Figure 3:
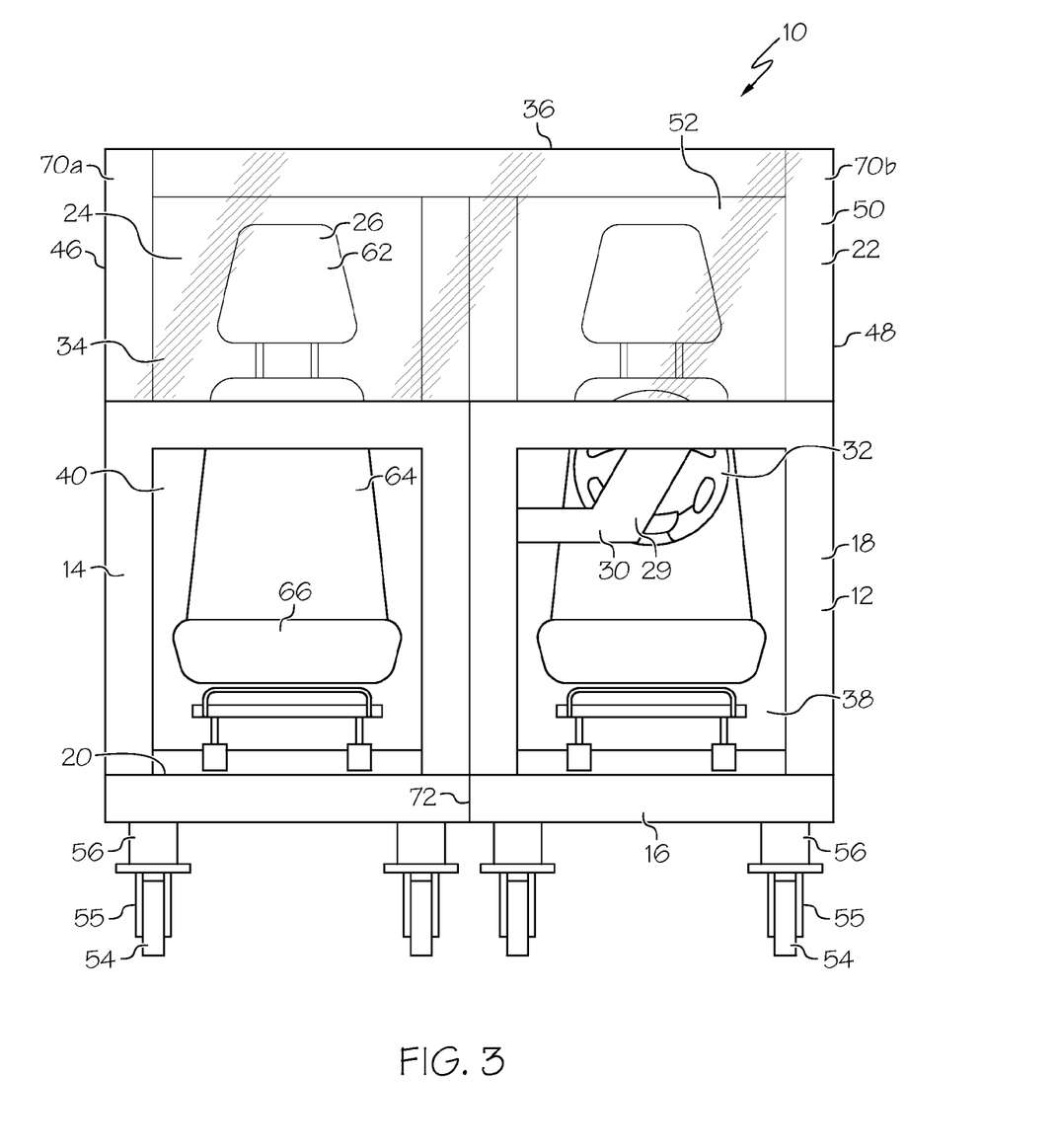
FIG. 3 is front plan view of the device of FIG. 2.
Figure 4:
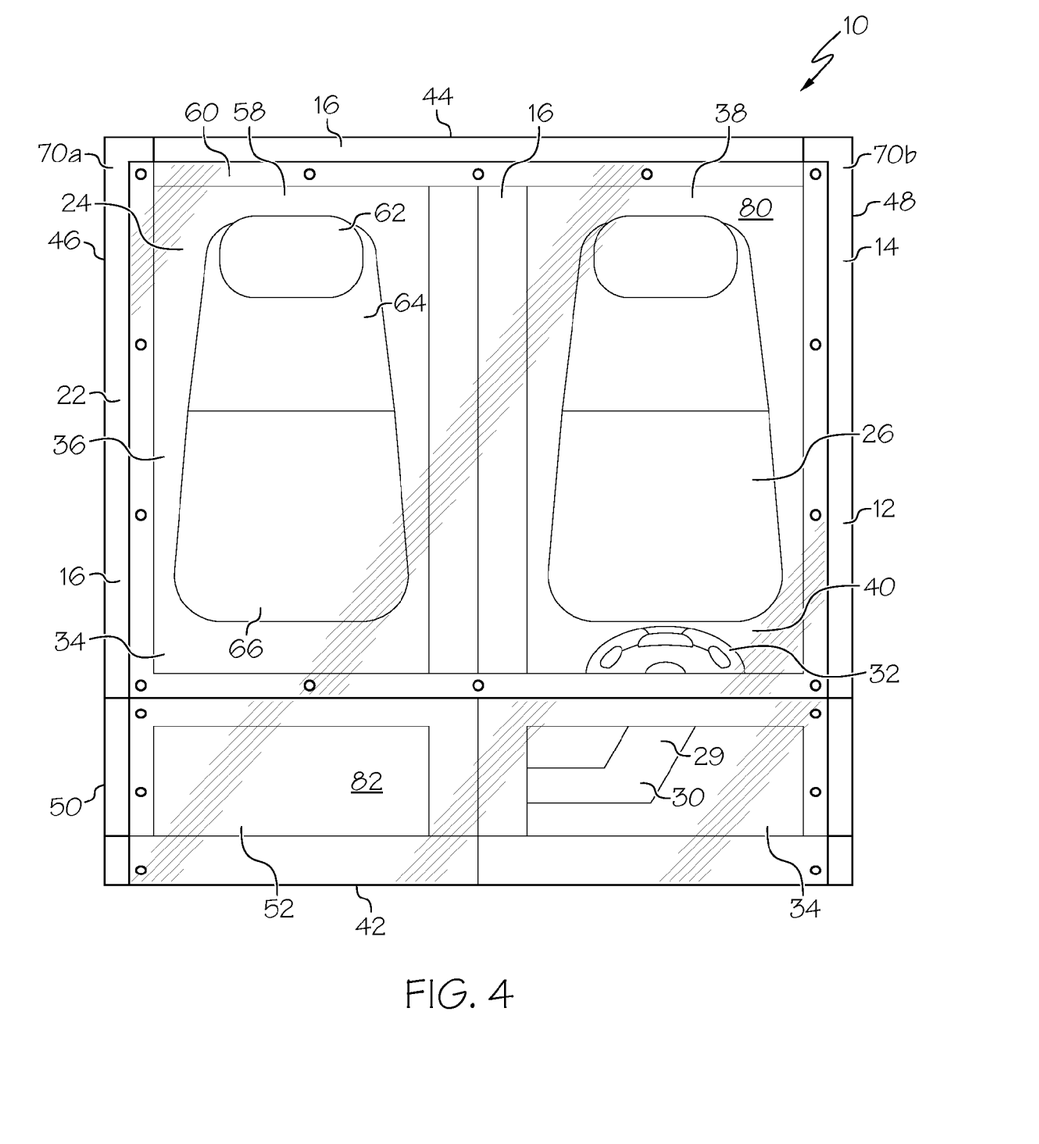
FIG. 4 is a top plan view of the device of FIG. 2.

As best seen in FIGS. 3 and 4, the framework 14 may be an open structure, where the gaps between the supports 16, 18 define one or more openings 34, representative of doors, windows, or other features of the simulated transportation device. The gaps between supports 16, 18 may further define one or more open frames 38 that are not representative of any specific features of the simulated transportation device, but rather supply additional portals through which an observer outside the device 10 may view the contents of the interior chamber 24. The base 20 may be an open frame 38 that optionally contains a floor. One or all of the openings/open frames 34, 38 may be covered by panes/panels 40, which may be transparent, to block or obstruct access to the interior chamber 24 from outside the device 10, or the openings/open frames 34, 38 may remain open.

Still referring to FIGS. 1-4, the framework 14 may be any of a variety of shapes and sizes. In one embodiment, the framework 14 is essentially a hollow rectangular prism or cube, where each of the base 20, a top 36, a front 42, a back 44, and two sides 46, 48 (in FIG. 3, "passenger" side 46 and "driver's" side 48) are openings/open frames 34, 38 bounded by supports 16, 18. In the depicted embodiment, the framework 14 is generally a rectangular prism, except that the front 42 includes an angled portion 50 that defines an opening 34 to receive a simulated or actual windshield 52. Alternately, the framework 14 may take any other shape, regular or irregular, so long as the selected design does not interfere with the functionality of the body 12 as a simulated transportation device. For instance, the framework 14 may be structured to closely mimic the exterior of the simulated transportation device or a portion thereof. The structural components of the framework 14 may be curved or angled, and need not be limited to straight, horizontal and vertical supports 16, 18.

The framework 14 may be constructed of any of a variety of materials. The structural components may be beams of metal such as aluminum, iron, steel, or any other metal of sufficient strength, which may be hollow, to allow the framework 14 to support the weight of the body 12, plus one or more human users. Alternately, the framework 14 may be constructed of wood, plastic, PVC, acrylic, or any other sufficiently strong material. The use of materials with a high strength-to-weight ratio, such as aluminum, may be preferable to maximize the support strength of the training device 10 while minimizing weight and preserving mobility and ease of transport. As will be discussed in more detail below, the structural components of the framework 14 may be permanently attached together by any known method, or the structural components may be removably detachable for repeated assembly and disassembly.

The simulated transportation device 10 has an upright orientation where the base 20 defined a bottom thereof relative to the surface the device is seated on and one or more non-upright orientations where a portion of the framework 14 defines a bottom relative to the surface the device is seated on. The upright orientation, shown in FIGS. 1-2, may simulate the conventional positioning of the simulated transportation device 10 during normal operating conditions. The non-upright orientation(s) represent emergency scenarios where the simulated transportation device 10 has rolled or flipped on its top or one of its sides. To enhance stability in the non-upright orientation(s), any of the top 36, the front 42, the back 44, side 48, side 48, or other surface of the framework 14 may be substantially planar in shape to better support the device 10. In one embodiment, the outer portions of the framework 14 intended to serve as potential bottoms include sections of rubber or other materials with relatively high coefficients of friction to provide added stability in the non-upright orientation(s). The framework 14 may further include additional support rods permanently or releasably attached thereto (not shown) to provide supplementary support for the training device 10 in the upright and/or non-upright orientation(s). In one embodiment, the training device 10 is light enough, for example less than about 350 pounds or less than 300 pounds or less than 250 pounds, such that the device 10 is readily manually repositionable between the upright and the non-upright orientation(s) by one individual or a few individuals.

The base 20 of the framework 14 may include a plurality of wheels 54 or rollers to enhance the mobility of the training device 10, facilitating convenient transport by one or a few individuals. The wheels 54 may be attached directly to the base 20, or the wheels 54 may be attached to legs 56, and the legs 56 may be attached to the base 20. One or more of the wheels 54 may include a brake (not shown) for enhanced safety to restrict the movement of the training device 10 when in use. The wheels 54 may be mounted on rotatable carriers 55 to permit swiveling of the wheels 54 for a greater range of motion during transport.

In one embodiment, the legs 56 are adjustable to various heights, such that when the legs 56 are set at equal heights, the body 12 (in the upright configuration) is generally level relative to the ground/support surface, but when the legs 56 are set at different heights, the body 12 is tilted at an angle relative to the ground/support surface. For example, with reference to FIGS. 2 and 3, if the legs 56 seen in FIG. 1 were raised by two feet (corresponding to the left leg 56 of FIG.

3), but the legs 56 opposite the depicted legs 56 (corresponding to the right leg 56 of FIG. 3 and not seen due to perspective of FIG. 2) remained unadjusted, then the entire body 12 would be tilted toward the "driver's" side 48, and the central legs 56 shown in FIG. 3 would be elevated off the ground/support surface.

Thus, by variously adjusting the heights of one or more legs 56, many different tilt angles of the body 12 can be achieved to simulate a variety of emergency scenarios of the simulated transportation device while maintaining the training device 10 in the upright orientation. Further, the base 20 of the framework 14 may include the legs 56 for the tilting functionality even without the wheels 54. The legs 56 may function by any mechanism of length adjustment known in the art, including but not limited to a system of telescopic tubes with a plurality of holes drilled therein to define different height settings, coupled with a bar to retain the tubes at the desired height setting (not shown). The legs 56 may be adjustable to any maximum height, with any number of intermediate height settings less than the maximum height, but the maximum tilt angle should be less than about 45 degrees to ensure stability of the device 10 in the tilted stated. Further, it should be understood that other aspects of the framework 14, such as the supports 16, 18, may include extendable tilting mechanisms analogous to the legs 56 for use in the non-upright orientation(s). The training device 10 may also include counterbalance mechanisms (not shown) such as supplementary support bars or weights to further enhance stability in the tilted orientations, or the device 10 may be tied to an external structure for added support.

As earlier described, some or all of the openings/open frames 34, 38 of the framework 14 may include a panels 40 therein or thereon. The panels 40 complement the framework 14 to more fully encapsulate the interior chamber 24 of the body 12, thus contributing to a more realistic simulation environment by restricting the trainee's ability to extend his/her body through the openings/open frames 34, 38 and forcing the trainee to perform rescue techniques within the relatively confined space of the interior chamber 24, just as the trainee would likely face in an actual emergency scenario. In one embodiment, the base 20, the top 36, the back 44, and the front 42 have panels 40, but the sides 46, 48 do not. The sides 46, 48 may include hinged panels (not shown) to represent doors of the simulated transportation device.

The panels 40 may be permanently attached to the framework 14, for instance with welds, rivets, and the like, or the panels 40 may be removably detachable from the framework 14, for instance with a system of threaded bolts and nuts, magnetic attachments, a system of latches, hook and loop material, ties, and/or snaps, and the like. It should be appreciated that any mechanism of permanent or removable attachment may be used to attach the panels 40 to the framework 14 without departing from the scope of this disclosure, and that different panels 40 within the same training device 10 may be attached with different mechanisms. The panels 40 may attach to the framework 14 along the outer surface of the open frames 34, 38, the interior cavity surface of the open frames 34, 38, or at intermediate point within the width of the open frames 34, 38. In one embodiment, the panels 40 attach to inset portions of the open frames 34, 38 with depths approximately equal to the thickness of the panels 40, such that when the panels 40 are installed on the framework 14, the outer surfaces of the open frames 34, 38 and the outer surfaces of the panels 40 form generally smooth sides of the training device 10.

The panels 40 may be solid pieces of material that block the passage of light, such as pieces of sheet metal, wood, plywood, cardboard, opaque plastic, and the like, or the panels 40 may be formed in whole or in part with transparent or translucent material such as LEXAN® polycarbonate, plexiglass, safety glass, translucent plastic, and the like. The windshield 52 may be formed in the same way and of the same materials as the panels 40. Different panels 40 within the same training device 10 may have different construction in terms of both transparency and materials. In one embodiment, as seen in FIG. 3, the panels 40 have a "picture frame" construction, where a windowpane 58 of a first, translucent material is bounded about its perimeter by a border 60 of a second, more durable material, thus preserving the "see-through" functionality of a transparent panel 40 while simultaneously enhancing the durability of the panel 40 at its edges.

The more openings/open frames 34, 38 of the training device 10 that have transparent/translucent panels 40 (or remain uncovered), the better outside observers may perceive training exercises being conducted in the interior chamber 24 of the body 12. Thus, an instructor may initiate a training exercise for a trainee, and then observe the trainee's completion of the task from any of a variety of angles by moving around the training device 10 and watching through the various openings/open frames 34, 38. The instructor may then provide meaningful, detailed, real-time feedback to the trainee. Further, other class participants may similarly observe the trainee to learn from the trainee's actions during the exercise.

Figure 1:
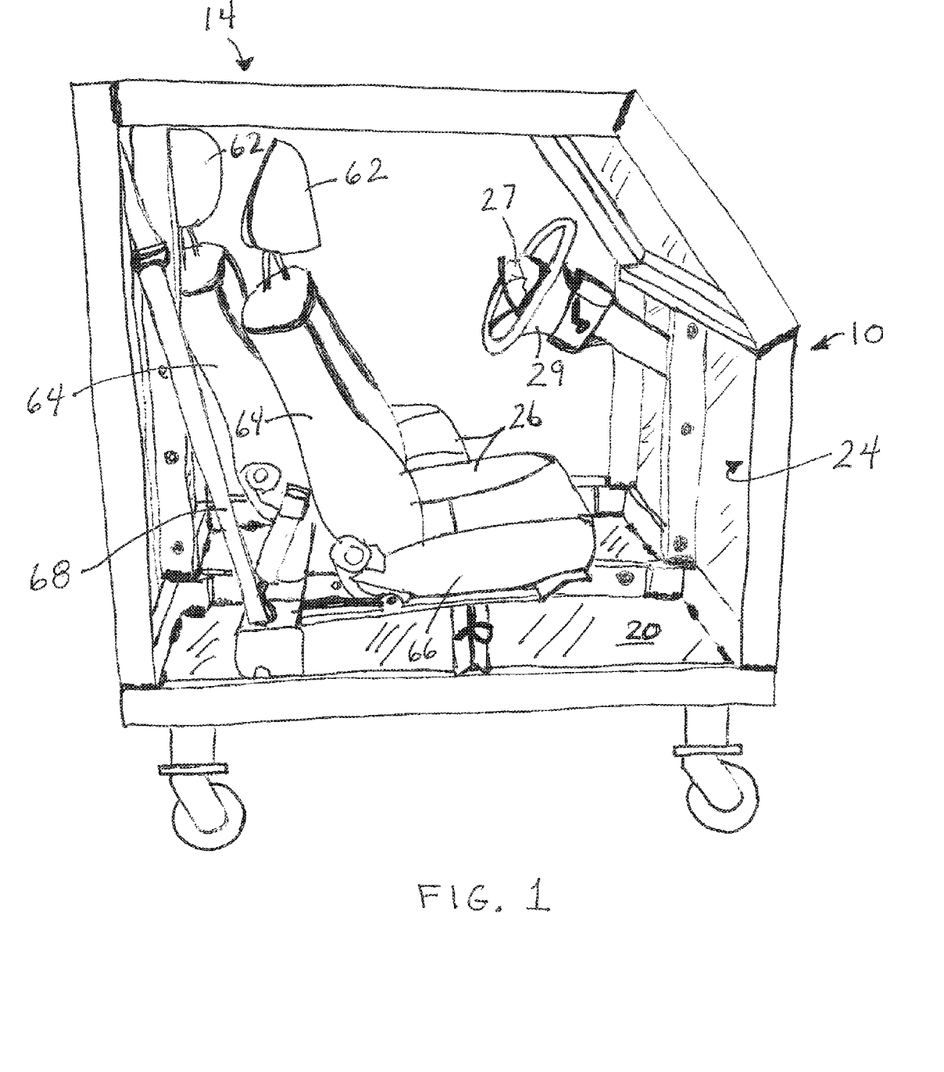
FIG. 1 is a photograph of a device for simulating a transportation emergency.

To further enhance the effectiveness of the training device 10 as a learning tool, the interior chamber 24 of the body 12 may be configured to visually mimic the interior cavity and/or cabin of a transportation device or a portion thereof. For example, to simulate a passenger car, the body 12 may be alternately sized to contain a single seat 26 (the driver's seat only) or two seats 26 (front driver and passenger seats), or even more seats (back seats). The number and orientation of the seats 26 depends on the type of the subject transportation device, the target size of the training device 10, and the desired level of realism. As seen in FIG. 1, the seat 26 may be an actual seat taken from the subject transportation device, including characteristic aspects such as a headrest 62, back support 64, cushion 66, and safety belt 68, but the seat 26 may alternately be a desk chair, a box, and the like (not shown) that is placed within the body 12 to represent a vehicle seat. The seat 26 may be securely attached (permanently or removably) to the framework 14 of the body so that the seat 26 remains in position whether the training device 10 is in the upright orientation (including tilted orientations) or the non-upright orientation. The medical-training manikin 28 (or a human) may be secured to the seat using the safety belt 68.

The manikin 28 may include mechanical or electrical features (not shown) designed to simulate an emergency victim's vital signs or other characteristics to enhance the training experience by providing real-time feedback to the user related to the effectiveness of the simulated rescue attempt. For example, if the user makes a choice that would aggravate the victim's injuries, the manikin may provide feedback by way of a video monitor (which may be attached to the framework 14 of the training device 10), sound effects, or other signals to indicate the likely consequences of the trainee's rescue activities in an actual emergency situation.

Figure 2:
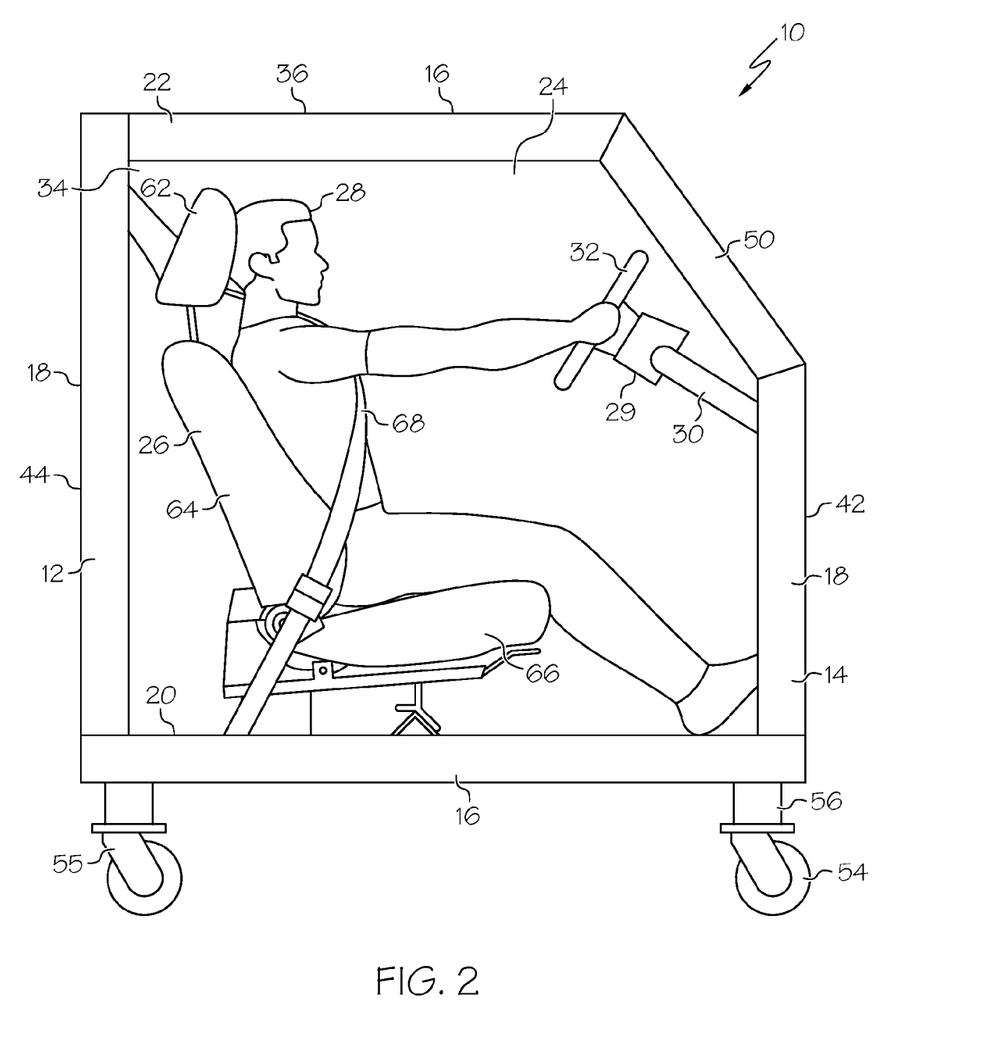
FIG. 2 is a side view of a device for simulating a transportation emergency with a manikin positioned therein.

The interior chamber 24 of the body 12 may include any number of props 29 to further enhance the realism of the training device 10 by adding common obstacles likely to exist in an actual emergency situation involving the simulated transportation device, or to otherwise enhance the look and feel of the simulation. The steering column 30 and the steering wheel 32 of the embodiments of FIGS. 2-4 are two such props 29, but any number of other props 29 may also be included in addition to or instead of the steering column 30 and steering wheel 32, such as a simulated rearview mirror, brake/gas/clutch pedals, a dashboard, a glove compartment, a central console between the seats 26, air bags 27, a child car seat, a breaking-glass simulator 76 (FIGS. 7-9; discussed below) and the like. Each prop 29 may be securely attached (permanently or removably) to the framework 14 or other aspects of the interior chamber 24 of the body 12 so that the prop 29 remains in position whether the training device 10 is in the upright orientation (including tilted orientations) or the non-upright orientation. Additional props 29 may be included that are intentionally not secured to the framework 14 to represent articles such as packages, books, coats, and the like that may be present in the simulated transportation device and would likely shift in position in an actual emergency situation.

Figure 6:
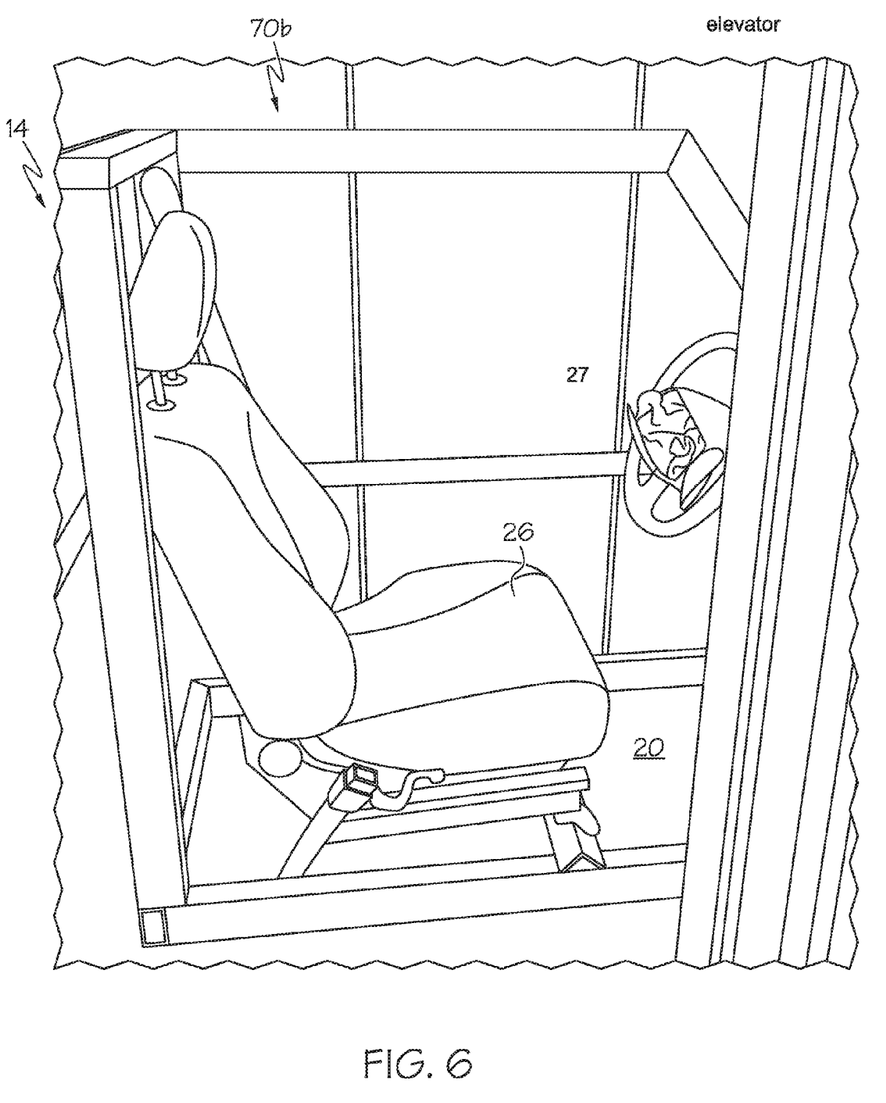
FIG. 6 is a photograph of one section of the device for simulating a transportation emergency within an elevator.

The air bags 27 (FIGS. 1 and 6) may be located at one or more locations within the body 12, including within the steering wheel 32. The air bags 27 may be inflatable and deflatable by any means for inflating and deflating air bladders, including any type of manual or electric pump, such that the air bags 27 are repeatably deployable for multiple simulation events.

The training device 10 may have a modular construction. In one embodiment, each of the structural components of the framework 14 may be removably detachable from the others, such that the entire body 12 can be deconstructed into a plurality of separate supports 16, 18 panels 40, wheels 54, legs 56, seats 26, props 29, and the like that can readily be manually assembled into the device 10. The components may be detachably assembled using any known method, such as a system of bolts and nuts, mating male/female threaded connectors attached/bored into to the components, a system of clasps, ties, snaps, and the like. Thus, the training device 10 may be stored and/or readily transported in a disassembled format, reducing the amount of space that the training device 10 occupies when not in use. In one embodiment, the training device 10 is a kit of the these and other components, optionally including the manikin 28, to be assembled into the structures described above for use. Such a kit may include a plurality of various props 29 to be selectively incorporated separately or together within the training device 10.

Figure 5:
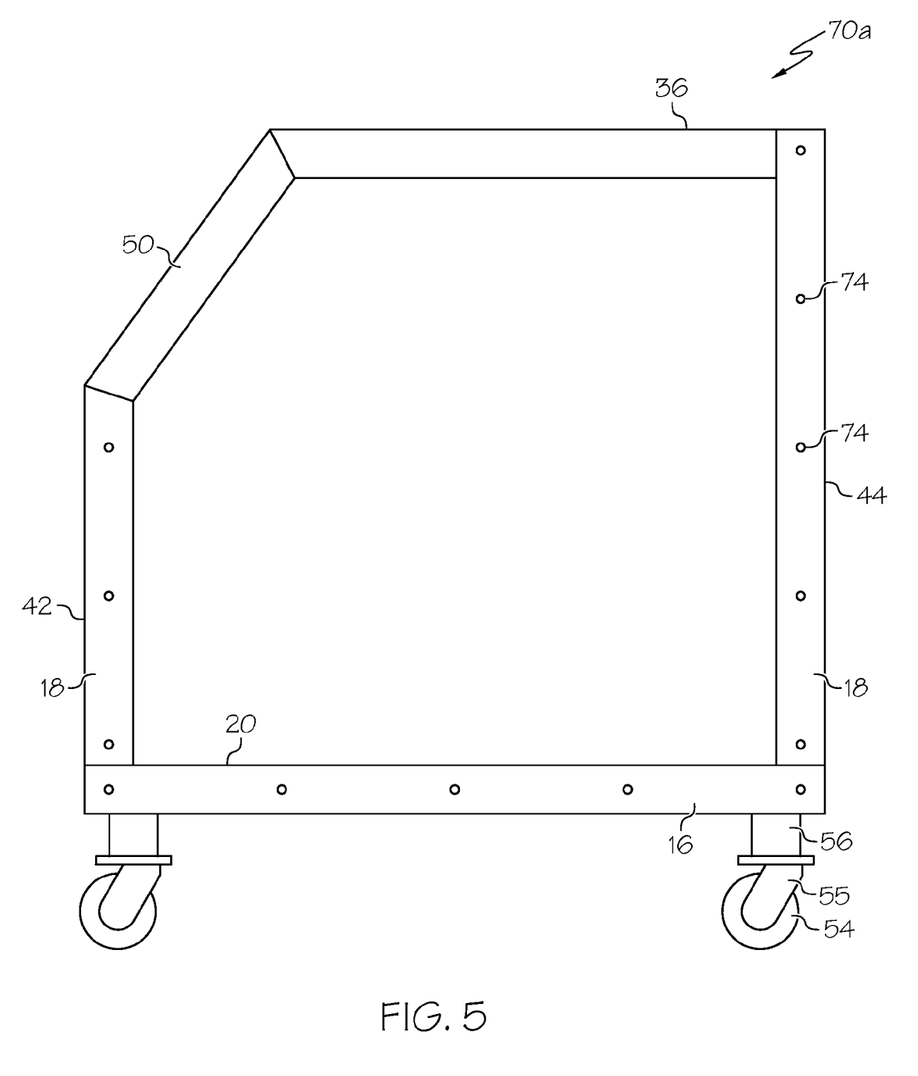
FIG. 5 is a side view of a modular section of the device of FIG. 2.

Alternately, referring now to FIGS. 3 and 5, the framework 14 of the training device 10 may be formed by the union of two or more distinct, complementary framework sections 70a, 70b that removably attach together to form the framework 14. The embodiment of FIG. 3 has two sections 70a, 70b jointed at the center 72 of the framework, where each section 70a, 70b forms approximately half of the complete framework 14, but the sections need not partition the framework 14 into equal portions. FIG. 5 is a side view of section 70a (without the seat 26) showing the detail of the portion of the section 70a that interfaces with the section 70b. When viewing FIG. 5, it should be appreciated that in this perspective, the supports 16, 18 that show parts of the base 20, the front 42, and the back 44 of the framework 14 are in a first plane that forms part of the center 72 of the framework 14, but the supports that correspond with top 36 and angled section 50 are in a second plane (depressed into the page) that corresponds with the "passenger" side 46 of the framework 14 (see FIG. 3).

The constituent supports 16, 18 within each section 70a, 70b may be permanently coupled, for example with welds and/or rivets and the like. Portions of each section are designed to interface with the other section(s) for releasably, removable connect to one other. In the embodiment of FIG. 5, the interfacing supports 16, 18 of section 70a contain a plurality of bores 74 therethrough, and the corresponding supports 16, 18 of section 70b (FIG. 3) also contains a plurality of bores 74 at analogous locations along the supports 16, 18. A system of nuts and bolts (not shown) may then be used to securely attach the sections 70a, 70b together where the bolt traverses the supports 16, 18 of each section 70a, 70b through the bores 74, and the nut is tightened to fix the bolt in place. Alternately, sections 70a, 70b may be releasably attached together by any other known mechanism, for example a series of latches, ties, clasps, and the like. While the depicted framework 14 has only two sections 70a, 70b, it should be understood that the framework 14 may have any number of sections necessary to construct the entire training device 10. Also, the other components of the training device 10 may variously be permanently or releasably attachable to the sections as earlier described.

As described above with respect to the framework 14 as a whole, the framework sections 70a, 70b may include openings/open frames 34, 38 that may have panes/panels 40 permanently attached or removably detachable thereto. Further, as shown in FIGS. 3 and 4, two or more sections 70a, 70b may jointly define one or more openings/open frames 34, 38, such that the complete opening/open frame 34, 38. For such jointly-defined openings/open frames 34, 38, an associated pane/panel 40 may be attached to more than one, or all, of the associated sections.

The sections 70a, 70b may be sized and shaped to facilitate efficient transport through building corridors. For example, the fully-constructed framework 14 may be too large to fit through a standard 2.5 to 3.5 foot doorway or into an elevator, but the sections 70a, 70b may be able to pass through without issue as shown in the photograph included as FIG. 6. Further, as seen in FIG. 3, each section 70a or 70b may have a stable base of wheels 54 such that each section 70a, 70b may roll independently even when detached from the framework 14 as a whole. In one embodiment, each section 70a, 70b has a maximum length of about five feet and a maximum width of about three feet such that each section 70a, 70b may both pass through doorways and corridors and also fit within standard-sized passenger elevators. In another embodiment, some or all of the horizontal supports 16 are hingedly movable or rotatable about the vertical supports 18 to which they attach, thereby allowing the sections to "fold up" into a generally linear configuration where all the horizontal supports 16 are generally parallel with each other, further enhancing transportability. Thus, the section system allows for easy transport between classrooms or other rooms in a building without requiring complete disassembly of the framework 14 before transport.

In one embodiment, a kit is provided that includes at least two framework sections 70 and the seat 26, where the framework sections 70a, 70b and seat 26 may be removably attached to each other to form the training device 10 as previously described, including all of the disclosed features. The kit may also include other components, such as any number of panes/panels 40, props 29, an manikins 28, and the like for use with the training device 10.

In one embodiment, the kit also includes a top 36 is seated on sections 70a, 70b (and others if present) when the sections are attached to one another. This is best seen in FIG. 4. The top 36 includes a first section 80 representative of a roof portion (panel 40) of the simulated transportation device 10 and a second section 82 representative of a windshield 52 of the simulated transportation device 10. The roof portion (panel 40), the windshield 52, or both may include a transparent panel of material.

The structure of the training device 10 having been described, a method for using the device 10 to train a trainee will now be disclosed.

The training device 10 may be transported to a selected use location such as a classroom where an instructor and/or at least one trainee intend to use the device 10. If the framework 14 of the device 10 is transported in a disassembled state, the constituent parts may be transported to the use location and assembled therein as earlier described. If the framework 14 of the device 10 has sections 70a and 70b, each section may be separately transported to the use location, and all sections may then be assembled to form the framework 14. If the device 10 includes wheels 54, the device 10 or the sections 70a, 70b, as appropriate, may be transported by rolling. Once in location, the wheels 54 may be locked to prevent further movement of the device 10.

If not already attached to the framework 14, the seat(s) 26 and the props 29 (if any) may be attached to the framework 14. If a manikin 28 (or a human volunteer) is to be utilized, the manikin 28 may be positioned on the seat 26, and the seatbelt 68 may be secured. If not already attached to the framework 14, the panels 40 (if any) may also be secured to the framework 14 as earlier described.

The body 12 of the device 10 may be positioned in the upright orientation or a non-upright orientation as desired by the instructor and/or trainee. If the device 10 includes legs 56 or other adjustable mechanisms capable of tilting the body as earlier described, the positioning of the device 10 may be further adjusted to the desired tilt angle.

With the training device 10 assembled in the use location and oriented as desired, training may begin. The instructor may demonstrate rescue techniques, or give the trainee instructions to "rescue" the manikin, and the trainee may then attempt to make the rescue as the instructor observes and/or provides feedback. If the training device 10 includes or is used in conjunction with the breaking glass simulator 76 (described below), the method may include the step of breaking a piece of breakable material in a controlled environment. Other trainees may also observe the exercise by viewing the simulated rescue through the openings/open frames 34, 38 and/or through any transparent panels 40. Alternately, one or more trainees may use the device 10 without an instructor to practice rescue techniques.

When use of the training device 10 is complete, the components of the training device 10 may be detached from each other as appropriate and transported to a storage location or to another classroom in the same manner as described above with respect to transporting the device 10 to the use area.

Instead of using the training device 10 to simulate rescue of a trapped occupant in a transportation device, the device 10 may alternately be used to teach and learn techniques for extricating oneself from a transportation device in an emergency situation. In this case, the training device 10 may be transported and assembled as earlier described, except that instead of inserting the manikin 28 in the seat 26, the trainee enters the device 10 (preferably in the upright orientation) and straps himself/herself to the seat 26 with the seatbelt 68. The device 10 may then be adjusted to a rolled and/or tilted orientation by an instructor or other person, and the trainee may then practice techniques for safely escaping the device 10.

Figure 7:
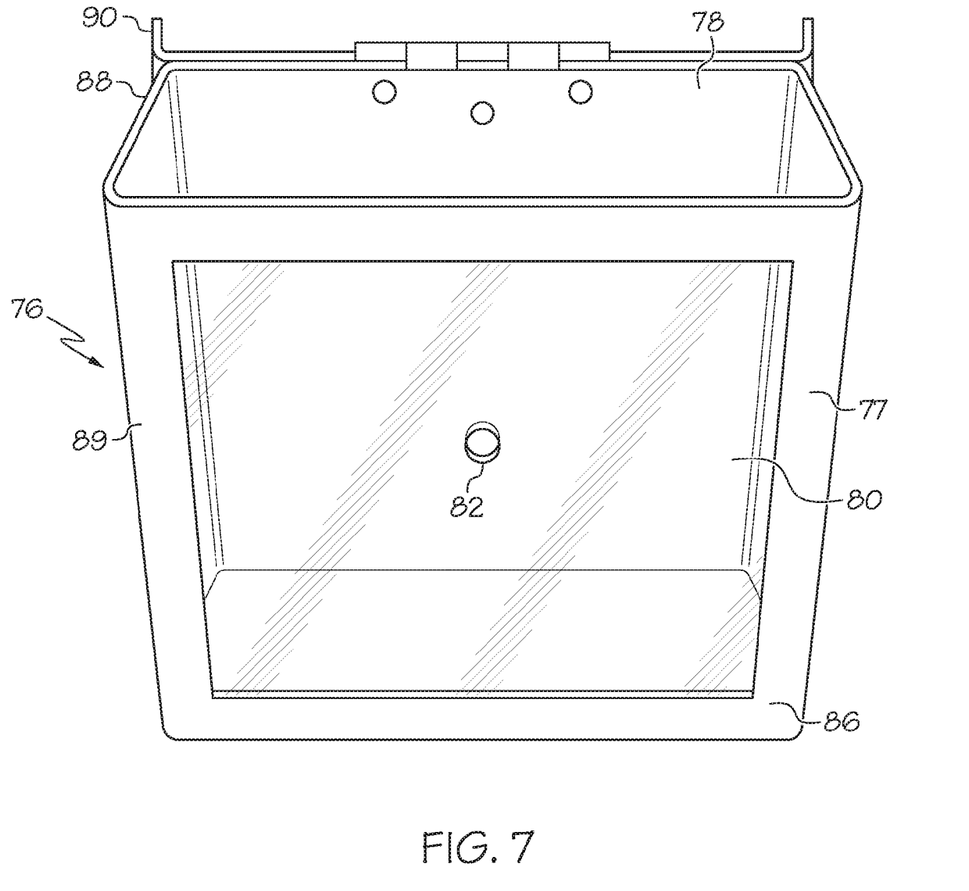
FIG. 7 is a photograph of a breaking-glass simulator.
Figure 8:
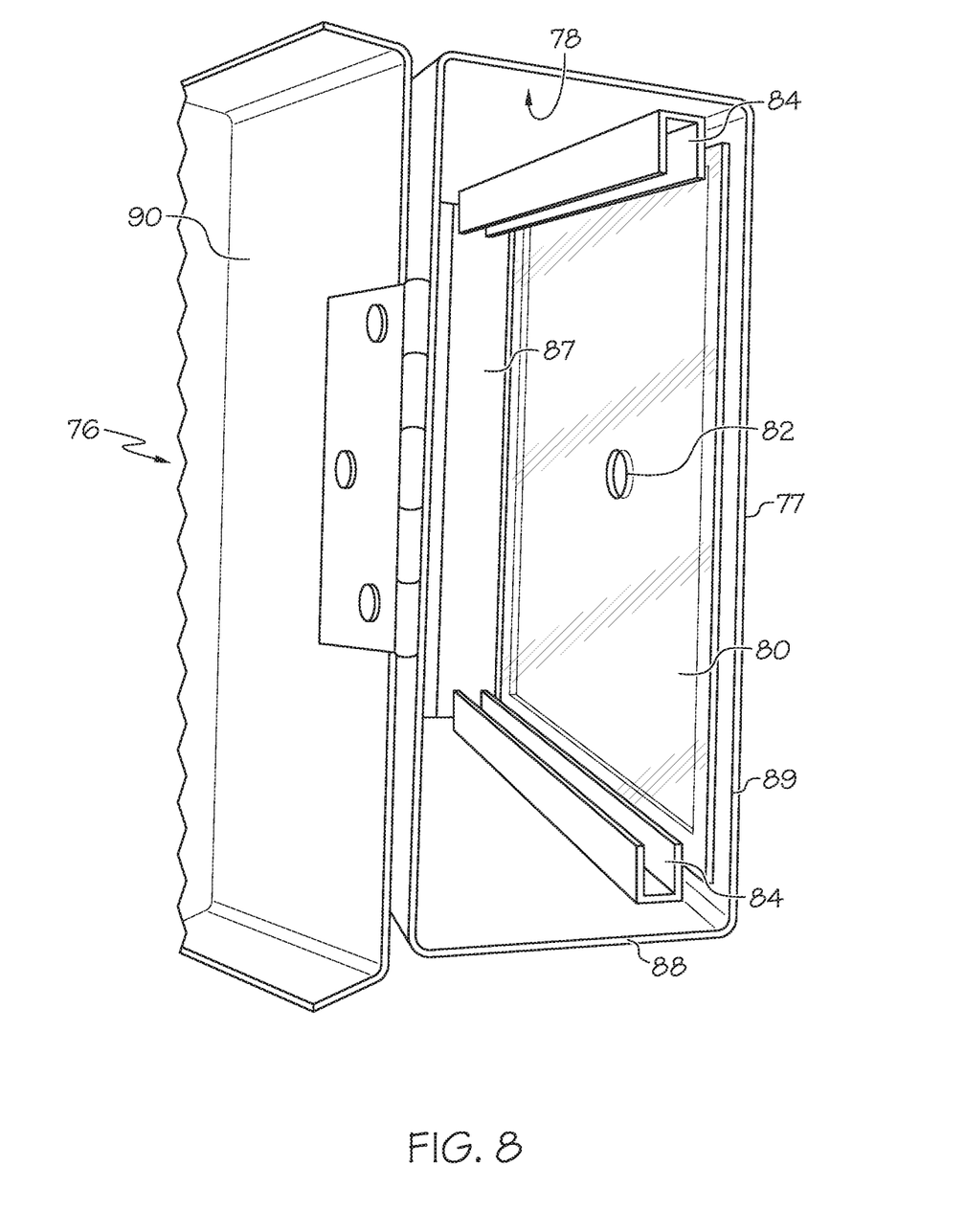
FIG. 8 is a photograph of a top view of the breaking-glass simulator of FIG. 7.
Figure 9:
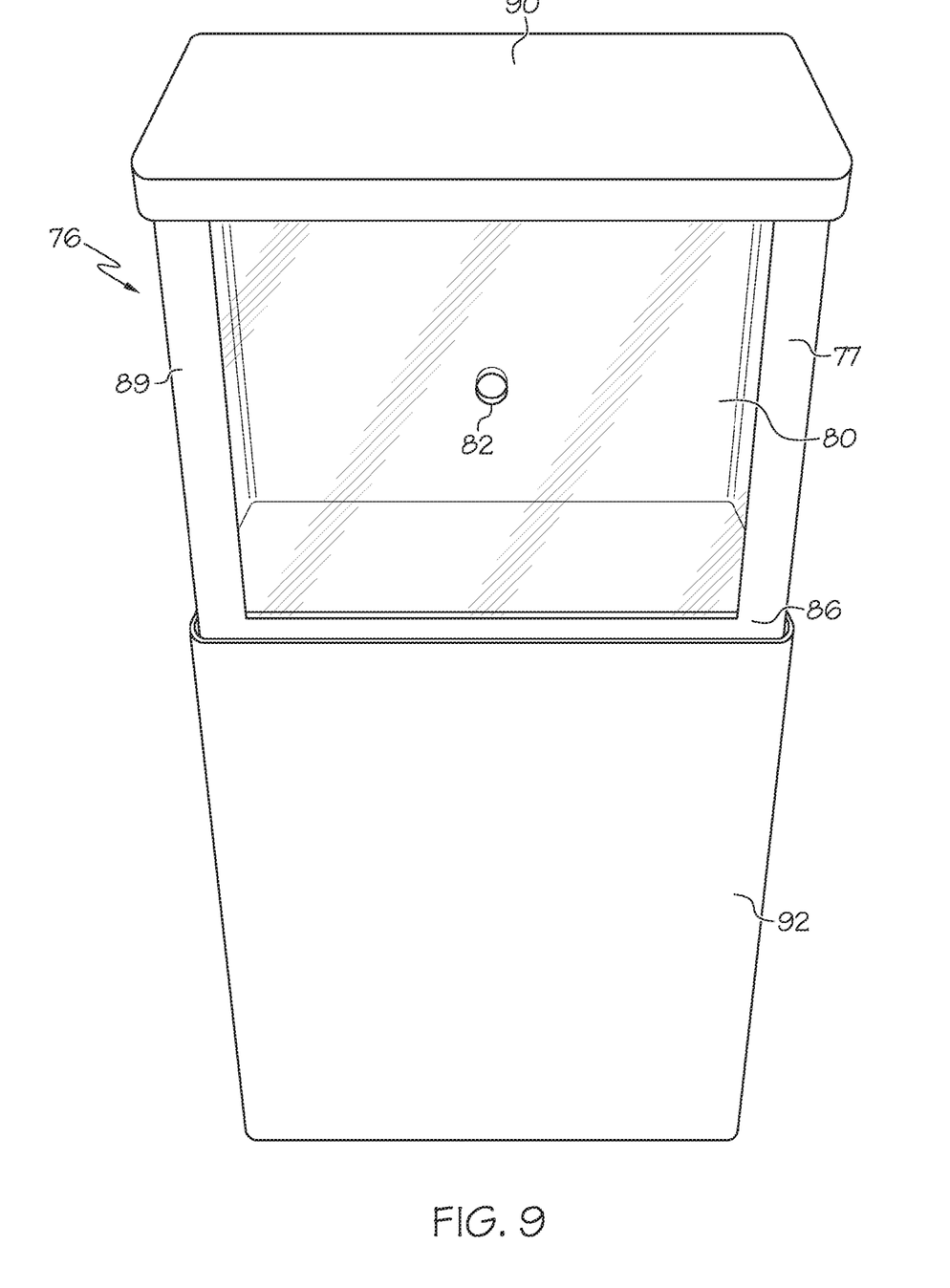
FIG. 9 is a photograph of the breaking-glass simulator of FIG. 7 positioned on a waste glass receptacle.

Referring now to FIGS. 7-9, the training device 10 may include the breaking-glass simulator 76 as a prop 29, or as a separate apparatus for use in conjunction with the training device 10, to provide trainees with the opportunity to practice glass breaking techniques used in actual emergency situations to safely remove glass in a controlled manner from transportation devices at the scene of an accident. A rescuer will often use a window punch, which is essentially a small, pointed tool designed for this purpose. In an actual emergency, intentionally breaking-glass prior to rescue lessens the risk of injury to the emergency victim and/or rescuer from inadvertent glass breakage during the course of the rescue by preemptively eliminating or reducing the potential hazard.

The inherent risks involved with shattering glass and handling the resultant shards of broken glass make glass breaking techniques difficult to simulate in a classroom environment. Common teaching methods, such as practice with an actual vehicle, do not significantly minimize these risks. Thus, a breaking-glass simulator 76 is disclosed which provides an opportunity for trainees to safely use a window punch (or other glass-breaking tool) to break actual samples of breakable material in a classroom environment. The breaking-glass simulator 76 may be used with or without the training device 10.

The breaking-glass simulator 76 shown in FIGS. 7-9 is a container with an exterior surface 77 defining an inner chamber 78 with a base 86, a plurality of sides 88, and a lid 90. At least one of the sides 88 may have a transparent panel 80 that includes a hole 82 sized to receive a glass-breaking tool to brake a sheet of breakable material enclosed within the simulator 76. The inner chamber 78 of the simulator 76 may have one or more receiving members 84 (FIG. 8) for receiving a sheet of breakable material such as glass and a ledge 87 (which may be a portion of the base 86 or the receiving members 84) that supports a portion of the sheet of breakable material. The sheet of breakable material may be an actual section of tempered glass from a car window or windshield, or it may be another breakable or fragile material such as a piece of ceramic and the like.

The receiving members 84 may be rails, guides, channels, or the like attached to or integral with the surface of the chamber 78. In another attachment, the receiving member(s) 84 may be one or more clamps, ties, hook-and-loop connectors (VELCRO® hook-and-loop fastening material), or other fasteners to retain the sheet in position.

Regardless of the type and number of receiving members 84, in all embodiments, the receiving member(s) 84 needs to be positioned such that the sheet of breakable material when enclosed in the simulator 76 is positioned proximate to the hole 82 such that the tool has access to the sheet of breakable material to brake it. Thus, a trainee may pass a window punch or other tool through the hole 82 to contact and break the sheet of breakable material, and the resultant pieces of the broken sheet are safely contained within the inner volume 78 of the simulator 76. The hole 82 may be large enough to facilitate the passage of the window-contact portion of a window punch or other window-breaking tool, but also small enough that shards of the broken breakable material will not be able to readily pass through and escape the breaking-glass simulator 76 during use. In one embodiment, the hole 82 has a maximum width of about two inches at its widest expanse. The portion of the simulator 76 that includes hole 82 may be a transparent panel 80 set in a frame 89. This is advantageous because the trainee can see the placement of the tool and whether the sheet has broken.

As shown in FIGS. 7-9, the simulator 76 contains the glass shards because it includes lid 90 and, optionally, a waste glass receptacle 92 (FIG. 9). The lid 90 may be a hinged panel to facilitate opening and closing the simulator 76 to access the chamber 78 to replace and/or remove the used/broken sheets of breakable material with an unbroken sheet. Alternately, the lid 90 may be permanently affixed to the sides 88 in a closed position. If the lid 90 is permanently closed, it may have a slit (not shown) therethrough to facilitate insertion of the sheet of breakable material into the receiving members 84, and the slit may have a barrier, such as a plurality of bristles, a hinged flap biased in a closed position, an insertable cap, or other mechanism to generally seal the inner chamber 78 to prevent shards of broken sheet material from passing through the slit during use.

The base 86 may be a solid panel to prevent passage of pieces of broken breakable material, or the base 86 may be wholly or partially open, which permits broken pieces to freely fall out of the inner chamber 78. If the base 86 is open, the breaking-glass simulator 76 may be used in conjunction with a waste glass receptacle 92 (FIG. 9) to receive the broken sheets after use. The waste glass receptacle 92 may increase the storage capacity for broken sheet material and thus facilitate repeated use of the simulator 76. The breaking-glass simulator 76 and/or the waste glass receptacle 92 may have a door (not shown) to facilitate removal of broken sheet material.

In one embodiment, the breaking-glass simulator 76 is generally rectangular prismatic in shape, but it may alternately take any shape, including cylinders and other shapes with curved sides. The simulator 76 may be a free-standing apparatus, or it may be affixed to an external support, such as the training device 10 or the waste glass receptacle 92. The breaking-glass simulator 76 may be made of any material, but may preferably be formed of a material such that the inner chamber 78 may safely contain broken sheet material without puncturing, ripping, or breaking. For example, the simulator may be made of metal, wood, plastic, and the like, or combinations thereof. The transparent panel 80 may be constructed of LEXAN® polycarbonate, plexiglass, transparent plastic, acrylic or another translucent materials, and may preferably be formed of a material that does not easily shatter so as to minimize the risk of breakage and injury if the trainee misses the hole 82 and instead strikes the transparent panel 80 with the window punch.

To use the breaking-glass simulator 76 of FIGS. 7-9, the lid 90 is opened and a sheet of breakable material is inserted into the receiving members 84 of the inner chamber 78 of the simulator 76. The lid 90 is then closed. A trainee equipped with a window punch (or other glass breaking tool) inserts the window punch through the hole 82 of the frame 89 to breaks the sheet of breakable material using the techniques learned in class, and the broken pieces are contained within the simulator 76. The breaking-glass simulator 76 is then opened to safely dispose of the broken pieces.

Although various aspects of the disclosed emergency training device have been shown and described, modifications may occur to those skilled in the art upon reading the specification. The present application includes such modifications and is limited only by the scope of the claims.

What is claimed is:

1. A device for simulating a transportation emergency comprising:
a first framework section and a second framework section removably attachable to one another, wherein in an assembled state the first and second framework sections collectively define a passenger compartment of the device, each framework section comprising:
a base with a plurality of vertical front supports and vertical back supports extending upward therefrom;
a front horizontal support interconnecting the plurality of vertical front supports; and
a back horizontal support interconnecting the plurality of vertical back supports;
wherein one of the vertical front supports and one of the vertical back supports of the first framework section are in a plane parallel to a central longitudinal axis of the device and form a first part of a center framework, and one of the vertical front supports and one of the vertical back supports of the second framework section are in a plane parallel to the central longitudinal axis of the device and form a second part of the center framework;
wherein the first part of the center framework is matable against the second part of the center framework with the vertical front supports of the first and second framework sections removably attached to one another and the vertical back supports of the first and second framework sections removably attached to one another.

2. The device of claim 1, wherein the simulated transportation device is an automobile, a truck, a bus, a plane, or a boat.

3. The device of claim 1, further comprising, in the passenger compartment, one or more of a steering column, a steering wheel, one or more air bags, a passenger seat, and one or more seat belts.

4. The device of claim 1, wherein each open frame includes a panel of transparent material.

5. The device of claim 1, wherein the base comprises at least one leg with an adjustable height, wherein the height of the leg defines a tilt angle of the base.

6. The device of claim 1, wherein the device has an upright orientation wherein the base defines a bottom thereof and one or more non-upright orientations wherein a portion of the framework defines the bottom thereof; and the device weighs less than about 300 pounds thereby enabling one or more users to reposition the device into one of the non-upright orientations.

7. The device of claim 1, wherein each of the first and second framework sections includes a plurality of wheels and is independently rollable in an unassembled state.

8. The device of claim 1, further comprising a breaking-glass simulator comprising:
a container having an exterior surface defining an internal chamber and having a hole through the exterior surface sized to receive a tool;
a holder within the internal chamber to position a sheet of breakable material proximate the hole such that the tool has access to the sheet of breakable material to break the sheet of breakable material.

9. The device of claim 1, wherein each of the first and the second framework sections have a maximum width of about three feet and a maximum length of about five feet.

10. The device of claim 1, wherein each of the first and second framework sections define an opening representative of a vehicle door and define a plurality of openings representative of structural features of the simulated transportation device that block access to the passenger compartment; and wherein one or more open frames representative of structural features has a panel of transparent material providing viewing of the passenger compartment to an observer outside the device.

11. The device of claim 1, further comprising a top seated on both of the first and second framework sections.

12. The device of claim 11, wherein the top includes a first section representative of a roof portion of the simulated transportation device and a second section representative of a windshield of the simulated transportation device.

13. The device of claim 12, wherein the roof portion, the windshield, or both include transparent panels.

14. A kit for a device for simulating a transportation emergency comprising:
   at least two framework sections, each having a maximum width of about three feet and a maximum length of about five feet, attachable to one another along a centerline dividing the device into a driver side section and a front passenger side section to define a passenger compartment; and
   a seat for receiving a human or a medical-training manikin;
   wherein each framework section comprises:
      a base with a plurality of vertical front supports and vertical back supports extending upward therefrom;
      a front horizontal support interconnecting the plurality of vertical front supports; and
      a back horizontal support interconnecting the plurality of vertical back supports;
      wherein one of the vertical front supports and one of the vertical back supports of a first of the two framework sections are in a plane parallel to a central longitudinal axis of the device and form a first part of a center framework, and one of the vertical front supports and one of the vertical back supports of a second of the two framework sections are in a plane parallel to the central longitudinal axis of the device and form a second part of the center framework;
      wherein the first part of the center framework is matable against the second part of the center framework with the vertical front supports of the first and second of the two framework sections removably attachable to one another and the vertical back supports of the first and second of the two framework sections removably attachable to one another;
   wherein the seat is positionable within the passenger compartment.

15. The kit of claim 14, wherein the framework sections each define one or more openings representative of an access opening into the simulated transportation device and one or more open frames representative of structural features of the simulated transportation device that block access to the chamber, and further each framework section comprises at least one transparent panel attachable to or within at least one of the one or more open frames representative of structural features.

16. The kit of claim 14, further comprising one or more of a steering column, a steering wheel, one or more air bags, a passenger seat, and one or more seat belts positionable within the passenger compartment.

17. The kit of claim 14, wherein each framework section includes a plurality of wheels and is independently rollable.

18. The kit of claim 14, wherein at least one opening or open frame is jointly defined by the two framework sections.

19. The kit of claim 14, further comprising the medical-training manikin.

20. The kit of claim 14, further comprising a breaking-glass simulator comprising:
   a container having an exterior surface defining an internal chamber and having a hole through the exterior surface sized to receive a tool; and
   a holder within the internal chamber to position a sheet of breakable material proximate the hole such that the tool has access to the sheet of breakable material to break the sheet of breakable material.

21. A breaking-glass simulator comprising:
   a container having an exterior surface defining an internal chamber, the exterior surface comprising a transparent panel as at least a portion of one side of the container, the transparent panel defining a hole through the exterior surface sized large enough to receive a window-contact portion of a window punch and small enough that shards of broken glass do not escape through the hole; and
   a holder disposed within the internal chamber to position a sheet of window glass proximate an interior surface of the transparent material in proximity to the hole such that the window-contact portion of the window punch has access to break the sheet of window glass; and
   a waste receptacle positioned below the holder to collect the shards of broken glass.

* * * * *